(12) United States Patent  (10) Patent No.: US 9,307,509 B1
Heninwolf et al.  (45) Date of Patent:  Apr. 5, 2016

(54) TRANSMITTING RADIO SIGNALS USING SIMULTANEOUS RETRANSMISSION

(71) Applicant: Google Inc., Mountain View, CA (US)

(72) Inventors: Paul Heninwolf, San Carlos, CA (US); Menno Marringa, San Francisco, CA (US)

(73) Assignee: Google Inc., Mountain View, CA (US)

( * ) Notice: Subject to any disclaimer, the term of this patent is extended or adjusted under 35 U.S.C. 154(b) by 411 days.

(21) Appl. No.: 13/895,462

(22) Filed: May 16, 2013

(51) Int. Cl.
*H04W 56/00* (2009.01)
*H04L 12/927* (2013.01)
*H04L 12/761* (2013.01)

(52) U.S. Cl.
CPC ............. *H04W 56/002* (2013.01); *H04L 45/16* (2013.01); *H04L 47/806* (2013.01); *H04W 56/005* (2013.01); *H04W 56/0045* (2013.01)

(58) Field of Classification Search
None
See application file for complete search history.

(56) References Cited

U.S. PATENT DOCUMENTS

| 4,255,814 | A | 3/1981 | Osborn |
| 5,369,784 | A | 11/1994 | Nelson |
| 2003/0179721 | A1* | 9/2003 | Shurmantine et al. ........ 370/315 |
| 2007/0248038 | A1* | 10/2007 | Yamasaki et al. ............ 370/328 |
| 2008/0068252 | A1 | 3/2008 | Mehta et al. |
| 2009/0245124 | A1* | 10/2009 | Ichikawa et al. ............. 370/252 |
| 2011/0202270 | A1 | 8/2011 | Sharma et al. |

\* cited by examiner

*Primary Examiner* — Ashley Shivers
(74) *Attorney, Agent, or Firm* — Morris & Kamlay LLP

(57) ABSTRACT

Disclosed is a simulcast approach to broadcasting a message from each device, or node, of a network. A source device, such as a wall switch, may broadcast a message that may be received by a plurality of devices, such as light bulbs, in a network. Each of the plurality of devices may receive the message at substantially the same time. In response to the message, the receiving devices may determine if the message is to be retransmitted. If the message is to be retransmitted, it may generate a modified message. Each of the plurality of devices may transmit the modified message substantially simultaneously. To maintain timing to the source device between the devices in the network, the message may be configured to facilitate synchronization of the clocks to a timing signal in the message.

31 Claims, 3 Drawing Sheets

TRANSMITTING RADIO SIGNALS USING SIMULTANEOUS RETRANSMISSION

BACKGROUND

Conventional networks of radio-connected devices propagate messages from an initiating device to an intended recipient device through a series of "hops" or relays through one or more of the other devices in the network. However, conventional systems typically include algorithms that determine a best communication path, or "series of hops," for a message to reach an intended recipient device. For example, an initiating device may need to know all of the devices in a network, each device's capabilities, past history of successful hops and failed hops between the known devices, and similar information about the performance of the devices in the network prior to sending a message. Using this information, the initiating device may execute an algorithm that may identify a "best" communication path that transmits the message from one network device to another until the message is delivered to the intended recipient. However, the execution of the algorithm consumes processing resources and may add latency to the network traffic. Furthermore, the results generated by the algorithm may be unreliable in dynamic conditions.

BRIEF SUMMARY

According to an implementation of the disclosed subject matter, a method is provided that may include a first device that may receive a first message from a source device. The message may include data identifying a destination device from among a plurality of devices in a wireless network. A determination may be made whether a first device is an intermediary device. A time period for broadcasting a modified message may be identified. A clock of the first device may be synchronized to a predefined timing signal included with the first message. The first device may transmit a first modified message based upon the synchronized clock and the identified time period.

According to an implementation of the disclosed subject matter, a method is provided that may include a first device of a plurality of devices in a wireless network that may receive a first message from a source device. The first message may include a retransmission value and a destination device identifier that may identify a destination device from among the plurality of devices. A predefined timing signal may be appended to the first message received from the source device. Based upon a result of a comparison of the destination device identifier with a first device identifier, a sequence of actions may be performed. When the first device is determined not to be the destination device, a retransmission value included in the first message may be decremented. A first modified message may include the decremented retransmission value. The first device may broadcast the first modified message based upon the first message and the predefined timing signal. When the first device is determined to be the sole destination device, an acknowledgement signal indicating that the first message was received by the destination device may be transmitted, after a period of time corresponding to the remaining expected retransmissions. The transmission of the acknowledgement signal may be at a time selected without regard to the timing signal.

According to an implementation of the disclosed subject matter, a method is provided that may include the generation of a data frame based on input signals received at a processor. The data frame may include data that may identify a destination device and a retransmission value. A timing signal may be appended to the end of the data frame. A message may be broadcast simultaneously to a plurality of devices. The message may be received by a plurality of intermediary devices that are not the destination device. The message may be processed by all of the intermediary devices that receive the message to determine if the message is to be retransmitted based on the retransmission value. An intermediary device clock may be substantially synchronized to the timing signal appended to the message. A modified message may be generated at the intermediary devices by changing the retransmission value in the message. The modified message may be broadcast substantially simultaneously by each of the respective intermediary devices according to the intermediary device's synchronized clock the modified message.

Additional features, advantages, and implementations of the disclosed subject matter may be set forth or apparent from consideration of the following detailed description, drawings, and claims. Moreover, it is to be understood that both the foregoing summary and the following detailed description includes examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Disclosed is a simulcast approach to transmitting a message from each device, or node, of a network. Devices envisioned to implement the disclosed implementations may be network controllers, network relays, computing devices including general purpose computers, smart phones, tablet computers, and the like, wall switches, light fixtures or bulbs, appliances, such as refrigerators, dishwashers, printers, water valves, office products and the like. A source device, such as a wall switch, may broadcast a message that may be received by a plurality of devices, such as light bulbs, in a network. Each of the plurality of devices may receive the message at substantially the same time. In response to the message, the receiving devices may determine if the message is intended for it. If the device is not the sole intended recipient, it may generate a modified message. The receiving devices of the plurality of devices may transmit the modified message substantially simultaneously. To maintain synchronization between the devices in the network, the message may be configured to facilitate synchronization of the clocks of the devices.

For example, each message may include synchronization bits that are used by the receiving device to maintain synchronization of the device's clock to the message. Each device, or node, in the network that receives the message may use the message to synchronize a clock in the respective device. After processing the message and waiting a time period, each device may transmit a modified message at substantially the same time as other devices in the network because the clocks of the devices are substantially synchronized to one another. The coordination of the transmission of the modified message by each device may reduce the amount of network traffic and also eliminate the need to determine the relay route that the message should take from the source device to the destination device.

Figure 1:
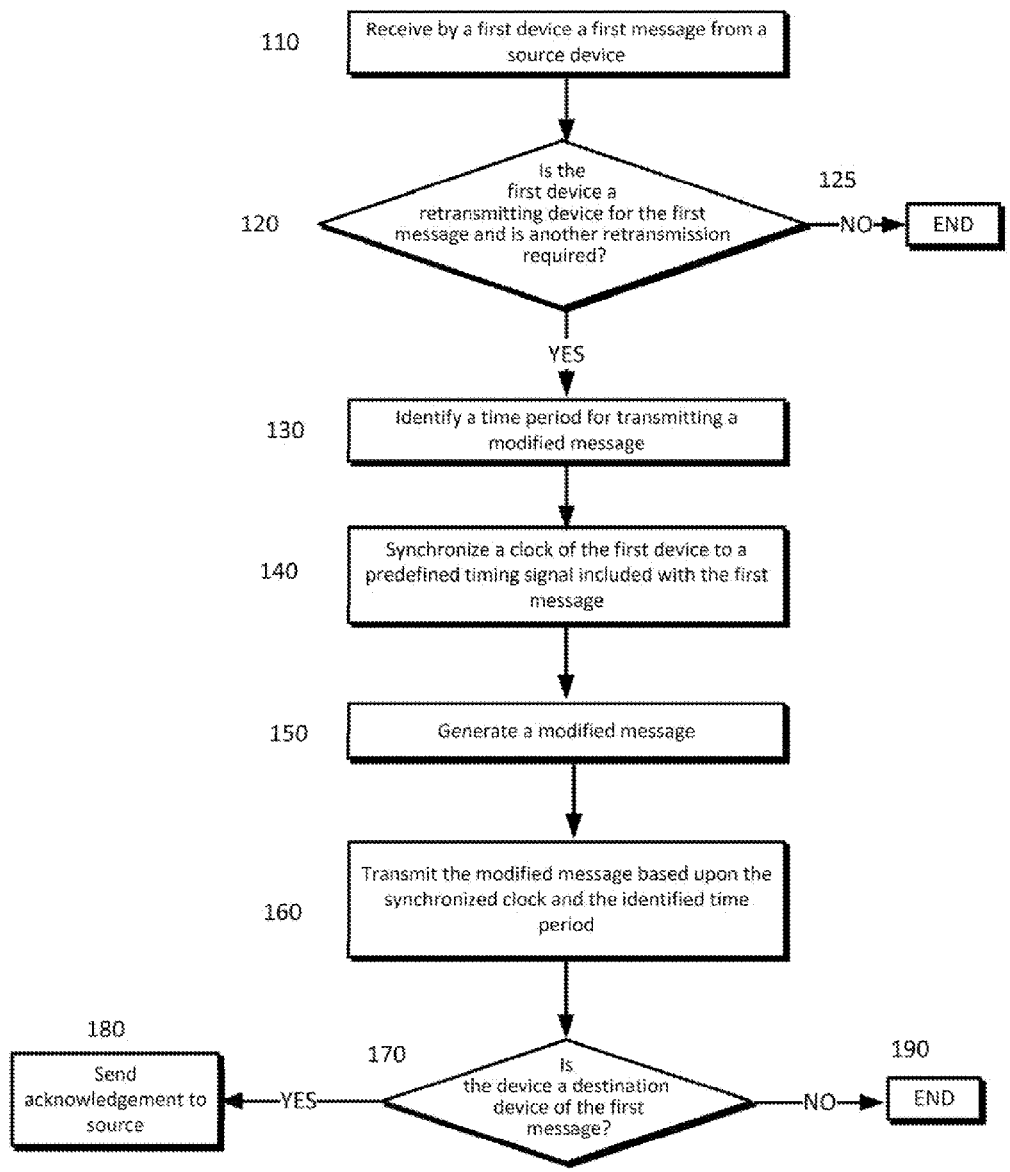
FIG. 1 shows a flow chart according to an implementation of the disclosed subject matter.

FIG. 1 shows a flow chart according to an implementation of the disclosed subject matter. The process 100 may be applicable to a plurality of devices in a network that communicate with one another. Each device of the plurality of devices may implement the process 100.

At step 110, a first device may receive a first message from a source device. The message may include data identifying a destination device, such as a destination device that is one of a plurality of devices in a network. The destination device may be one or more devices intended to be the recipient of the message. The message may include additional information. For example, the additional information may include commands; information related to the commands; timing information; information related to the message, such as a total number of frames, the frame number, the frame length in bits or bytes, the number of time the message is to be retransmitted; a timer start indicator that signals a timer to start so an identified time period may be determined for broadcasting a modified message, and the like. Each device that receives the message may modify, or change, the message based on predetermined messaging protocols. In an implementation, the message may be a packet of data. A packet may be a data unit carrying a complete message from a source device (i.e., the originator device of a packet) to one or more destination devices. A packet may be longer than a particular network's frame size, requiring the packet to be split into multiple frames. A frame may be an uninterrupted transmission from a single device, typically including a preamble, a sync sequence, a header, and a payload. Each frame may be transmitted using the same simulcast relay rules as described herein. All of the frames in a multiple frame transmission may be timed relative to the first transmitted frame but also independently of the timing of the previous frames of the multiple frame transmission.

At step 120, a processor in the first device may determine if the first device is an intermediary device or the sole destination device. An intermediary device may be any device that is a device that is to retransmit the first message. The determination may be made by comparing a device identifier of the first device to an identifier of the destination device or devices that may be included in the message. Since the message is simulcast to a plurality of devices, a second device or any other device in the plurality devices may also compare their respective device identifiers to the destination device identifier in the message. Of course, methods other than a comparison, such as a calculation, may be used to determine if the first device is the destination device or an intermediary device. At step 120, another determination is whether a retransmission of the message is necessary. If the determination that the first device is not a retransmitting device and another retransmission is required, the process 100 may proceed to step 125, and end. In response to the determination ("YES") that the first device is a device that retransmits the message, such as an intermediary device, and that the message is to be retransmitted, the process may continue to step 130.

At step 130, the first device may identify a time period for broadcasting a modified message. The time period may be an amount of time that the first device will wait before transmitting the modified message. For example, the device may identify the time period for transmitting based on the time of reception of the first message, or when the first message was received. Alternatively, the time period may be a sum of the time of the message duration and a predefined waiting time period. The message duration may be known and may be measured from the reception of the first message. The identified time period may be determined, for example, based on when a last data frame of the first message ends, which may be indicated by a bit in the message. This may be defined as a standard defined time following the final data frame received. The identified time period may also be determined, for example, after a number of bits are detected in a message, or based on a timer that started when the message was received. In an implementation, the use of a number of bits in the message, which may be "padding" added to the end of the message, may function as a timing signal that allows the intermediary device to maintain clock synchronization with the sending device and/or other devices in the network, as disclosed herein. The identified time period may also include the predefined waiting time period. The identified time period for each retransmission may be based, for example, on the final, not initial, portion of the received frame. In order to allow processing time by the relaying devices, or nodes, this delay, for example, a few bits to a dozen or so bytes, may be greater than desired if maximum bandwidth was the goal.

The configuration of the message may be used to identify a time period for transmitting the modified message. In an example, each frame may indicate which portion of a split, multi-frame packet is being sent by the source device and how many frames total may be needed for a complete packet (or, the length of the packet in bytes, from which any device can determine the required frame count). The maximum duration of a frame may be defined such that the specified (or compliant) difference in clock rates, aggregated over the length of the frame, does not exceed a significant portion of each transmitted baud. As disclosed herein, a baud refers to a single transmitted unit of data, and frequently there is one bit per baud.

The intervening period between the last field of the frame that requires interpretation or processing and the start of a subsequent message (or frame) may be filled with either additional, non-interpreted/processed data and/or with a simple bit pattern such as 101010 . . . , which allows the receiving nodes to have an up-to-date and synchronized baud clock (assuming one bit per baud in this example). The series of bits may change in value at a frequency similar to the frequency of the clock in the respective receiving device, or generally at any frequency sufficient to allow for synchronization of the clock to the changes in the bit pattern. This additional data may be referred to as predefined timing signal that fills a synchronization time period. The predefined timing signal may be appended to the first message. The predefined timing signal of the synchronization time period may minimize the drift between clocks of the intermediary devices by providing consistent changes in data values at consistent time intervals. The amount of acceptable clock drift for each device may depend on the expected performance of the receivers in correctly interpreting the overlapping transmissions of messages from a source device and modified messages from other intermediary devices. The predefined timing signal may allow the respective devices to maximize the usable length of a data frame and also to maintain clock synchronization between the respective intermediary device clocks within a threshold value, such as 100-250 microseconds, so that the retransmissions from the multiple intermediary devices may begin substantially in synchronization.

Returning to the process at step 140, a clock of the first device may be synchronized to the predefined timing signal included with the first message. Each respective device of the plurality of devices (i.e., other intermediary devices) that receive the message may synchronize their clock in response to the predefined timing signal in the message.

The first device, at step 150, may generate a first modified message from the received message. For example, the first message may be modified by changing the number of times the message is to be retransmitted, which is also referred to as "a retransmission value." For example, in response to a determination that the second device is an intermediary device, the retransmission value in the first message is decremented. The first modified message may include the data identifying the destination device as the intended recipient as well as the other additional information of the first message as discussed above.

The first device, which is an intermediary device, may retransmit a first modified message based upon the synchronized clock and the identified time period. (Step 160). The modified message may be transmitted based on the timing signal. For example, the first device may begin transmitting a modified message after the standard defined time that was discussed above. The retransmission of the modified message by the first device may be performed substantially simultaneously with a retransmission of similarly modified messages by other intermediary devices.

Although described with reference to the first device performing the above steps 110-160, all devices that receive the simulcast message may also perform steps 110-160 at substantially the same time as the first device.

The process may continue for additional devices. For example, the first message may be received by a second, third or more additional devices simultaneously with the first device. The second, third or more devices may perform the above steps 120-150. For example, the second device may generate a second device modified message that may be sent simultaneously with the modified message sent by the first device.

A benefit of the above described process may be evident, for example, when network devices rely on an internal timebase, such as a crystal oscillator at each node, and the time base of a device may drift over time from its neighbors. Because of this, the clocks of the respective devices can differ slightly in the network and transmissions from the devices may not be synchronized and may eventually be unusable.

If at step 170, the first device is determined to be the sole destination device ("YES"), the process may proceed to step 180. In response to a determination that the first device is an intended recipient device of the first message (i.e., the destination device), the first device may transmit an acknowledgement signal indicating that the first message was received by the destination device (step 180). The acknowledgement signal may be transmit at any time without regard to the timing signal. Alternatively, if the device is determined to not be the destination device (i.e. "NO" at step 170), the process 100 may proceed to step 190. At step 190, the process 100 may terminate.

Figure 2:
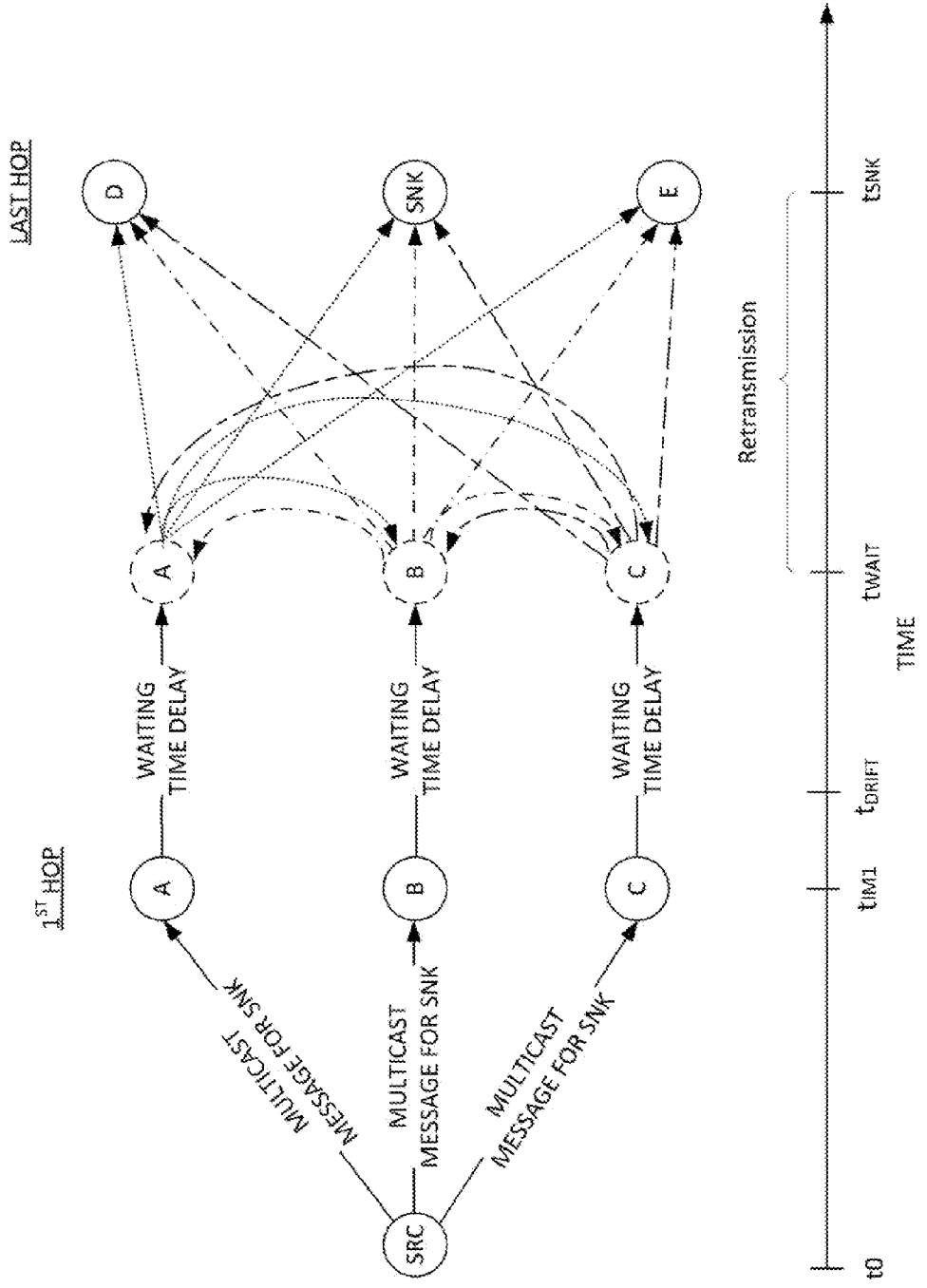
FIG. 2 shows a conceptual system according to an implementation of the disclosed subject matter.

The above described process is illustrated conceptually in FIG. 2. FIG. 2 shows a conceptual network according to an implementation of the disclosed subject matter. The network may include a number of devices, such as source device SRC, devices A-E, and a destination device SNK, that are configured to receive, process and transmit electrical communication signals. Device configurations will be described in more detail with respect to FIGS. 3 and 4. Source device SRC may send a broadcast a message intended for destination device SNK. Destination device SNK is the intended recipient device. The message may include an identifier of destination device SNK, the number of times the message is to be retransmitted (for example, two), and other additional information such as a command (e.g., turn "ON") and other information similar to that discussed above with respect to FIG. 1. Source device SRC may transmit the message at time t0, and devices A, B and C in the first hop may receive the message at intermediary time $t_{IM1}$. At the first hop, devices A, B and C may process the message to determine if any of devices A, B or C is the destination device. Devices D and E may be too far from device SRC to have received the signal or may be occluded from receiving the message from SRC by some interfering structure. Each device A-C may determine whether it is the destination device by comparing the destination device identifier in the message with their respective device identifier. In the example, the message is intended for device SNK, so each of devices A-C may determine that each is a retransmitting device and that the message is to be retransmitted based on a retransmission value included in the message. As a result, devices A-C are intermediary devices. Devices A-C may continue to further process the message to identify a time period for retransmitting a modified message. The identified time period may be determined as discussed above with respect to step 130 of FIG. 1. While the respective devices A-C are processing the message, the entire message or parts of the message may be used to synchronize the respective clocks on each device A-C to the respective appended timing signal of the message received at each of devices A-C. For example, the clock of each device A-C may synchronize itself to a predefined timing signal included in the message as discussed above. As shown in FIG. 2, the time delay may be measured in microseconds, and may be long enough to allow the clock in each device A-C to reach synchronization with the appended timing signal. As a result, respective devices A-C may maintain consistent timing within a predetermined threshold to the clock in source devices SRC. After the time delay, each of devices A-C may transmit a modified message at substantially time $t_{WAIT}$. The modified messages transmitted by each of the respective devices A-C at time $t_{WAIT}$ may be received by a few, or all of devices A-E, SRC and SNK in the network at time $t_{SNK}$. The time between time $t_{WAIT}$ and time $t_{SNK}$ may be referred to as the "retransmission time." For example, device A may transmit its respective modified message which may be received, as shown in FIG. 2, by devices B and C as well as devices D, E and SNK at time $t_{SNK}$. Additional devices D, E and SNK may also receive the modified messages transmitted by devices B and C.

Because the clocks in devices A-C maintain consistent timing with the previous transmitting device (in this case, source device SRC) using the appended timing signal, the devices A-C may transmit a modified message substantially simultaneously at time $t_{WAIT}$. Without the timing signal, there may be occasions when a clock in one or more of devices A-C may drift and may not be with the predetermined threshold timing of the source device's clock. In which case, instead of transmitting at time $t_{SYNC}$ the mis-timing device may transmit a modified message at, for example, time $t_{DRIFT}$. A benefit of the appended timing signal is to assist the devices in the network to maintaining a consistent clock with the initial transmitting device.

Continuing with the example, devices D and E may be the last hop and may receive the modified messages from devices A-C. Since neither device D nor device E are the intended recipient, or destination device, the two intermediary devices D and E may generate a modified message similar to devices A-C. Devices D and E may perform the process described above with respect to FIG. 1. Alternatively, if the modified message includes a retransmission value that indicates no further retransmissions are to be made, devices D and E may not generate a modified message. Device SNK may be the intended recipient of the message. Device SNK may process the message as described above with respect to FIG. 1. Device SNK may analyze the received message and may determine that it is the destination device. In response to the determination, device SNK may generate an acknowledgement signal that is transmitted back to the source device SRC.

In an implementation, the transmission of frame data may include a transmission in which the next frame in the packet sequence may be transmitted following the reception of a response related to receipt of the previous frame of the packet. Alternatively, or dynamically changing within a transmission sequence, a next frame in the sequence may be immediately transmitted following the last relay of the previous frame related to that packet. In an implementation, the transmission of all except for the last frame may optionally be transmitted without waiting for the acknowledgement to be returned. One implementation may be preferred when a relatively high percentage of multi-frame packets are not successfully received and another implementation may be preferred if most multi-frame packets arrive intact. The decision of which implementation is used may be determined dynamically. For example, the source device may indicate in each frame, which implementation may be followed, that is, whether the destination device shall respond to the frame or wait for the final frame of the packet before responding with an acknowledgement.

Figure 3:
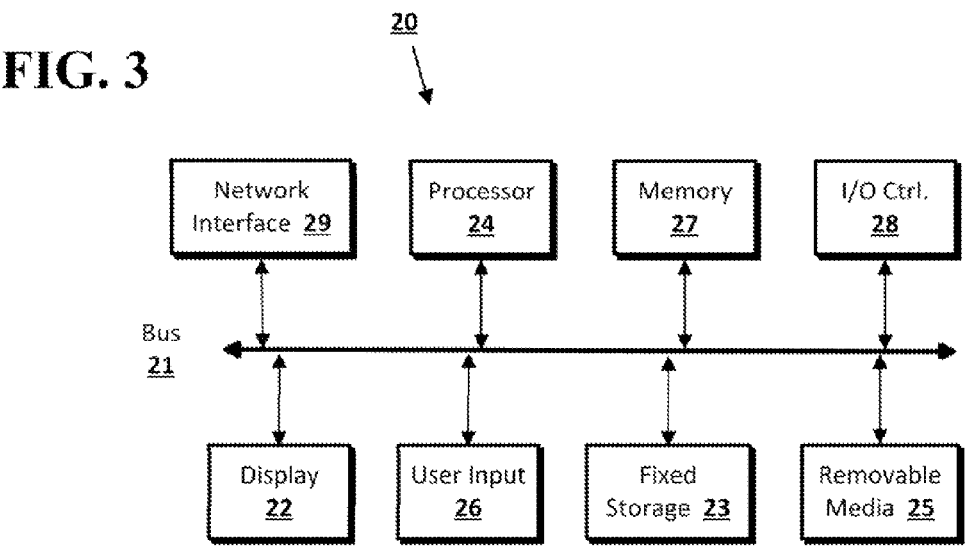
FIG. 3 shows a computer according to an implementation of the disclosed subject matter.

Implementations of the presently disclosed subject matter may be implemented in and used with a variety of component and network architectures. FIG. 3 is an example computer 20 suitable for implementation as a device of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, an optional user display 22, such as a display screen via a display adapter or an indicator light, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a mesh network, such as Zigbee, Z-wave, X-10, the like, a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 4.

Many other devices or components (not shown) may be connected in a similar manner (e.g., document scanners, digital cameras and so on). Conversely, all of the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 27, fixed storage 23, removable media 25, or on a remote storage location.

Figure 4:
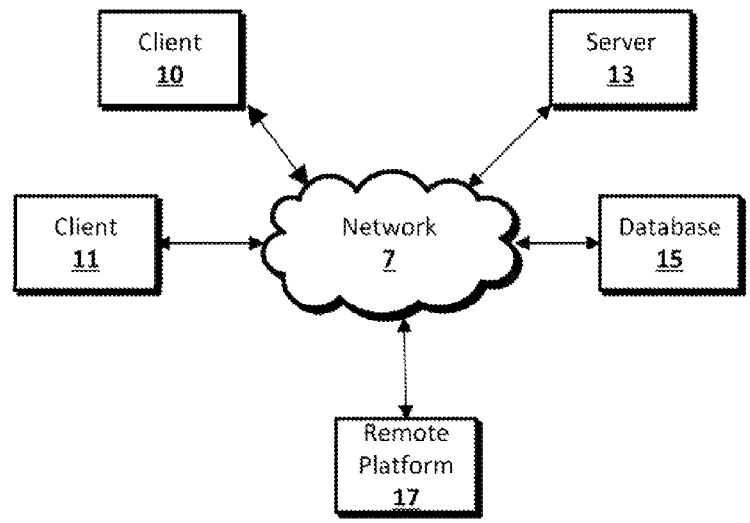
FIG. 4 shows a network configuration according to an implementation of the disclosed subject matter.

FIG. 4 shows an example network arrangement according to an implementation of the disclosed subject matter. One or more clients 10, 11, such as the electrical devices and appliances described above, such as wall switches, lighting fixtures and bulb, televisions and the like, local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more servers 13 and/or databases 15. The one or more servers 13 and/or databases 15 may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. One of the clients 10 or 11 may be a controller device that controls multiple other clients (not shown).

More generally, various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The physics of modern electrical devices and the methods of their production are not absolutes, but rather statistical efforts to produce a desired device and/or result. Accordingly, no limitation in the description of the present disclosure or its claims can or should be read as absolute. The limitations of the claims are intended to define the boundaries of the present disclosure, up to and including those limitations. To further highlight this, the term "substantially" may occasionally be used herein in association with a claim limitation (although consideration for variations and imperfections is not restricted to only those limitations used with that term). While as difficult to precisely define as the limitations of the present disclosure themselves, we intend that this term be interpreted as "to a large extent", "as nearly as practicable", "within technical limitations", and the like.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

What is claimed is:

1. A method comprising:
   receiving by a first device a first message from a source device, the message including data identifying a destination device from among a plurality of devices in a wireless network;
   determining that the first device is an intermediary device;
   determining a timing of the reception of the first message;
   determining a time period for transmitting a modified message, after the determined timing of the reception of the first message, by summing a predefined duration of the first message with a predefined synchronization time period;
   synchronizing a clock of the first device to a predefined timing signal included with the first message; and
   transmitting, by the first device, a first modified message based upon the synchronized clock and the identified time period.

2. The method of claim 1, wherein the predefined timing signal is appended to the first message.

3. The method of claim 1, further comprising:
   modifying the first message by changing a predetermined number of message retransmissions included in the first message.

4. The method of claim 3, wherein the changing comprises decrementing the number of message retransmissions.

5. The method of claim 1, further comprising:
   receiving the first message by a second device simultaneously with the first device;
   determining that the second device is an intermediary device;
   identifying a time period for transmitting a modified message;
   synchronizing a clock of the second device to a predefined timing signal included with the first message; and
   transmitting, by the second device, a second device modified message based upon the synchronized clock and the identified time period.

6. The method of claim 5, wherein the second device modified message is transmitted simultaneously with the modified message sent by the first device.

7. The method of claim 6, further comprising:
   synchronizing a clock in each respective device of the plurality of devices to the predefined timing signal in the message.

8. The method of claim 1, further comprising:
   in response to a determination that the first device is an intended recipient of the first message, transmitting regardless of the timing signal by the first device an acknowledgement signal indicating that the signal was received by the first device.

9. The method of claim 1, further comprising:
   in response to a determination that the message is to be retransmitted, transmitting the modified message based on the timing signal.

10. The method of claim 1, wherein the first modified message includes the data identifying the destination device as the intended recipient of the device.

11. The method of claim 1, wherein the message includes an indicator that signals a timer needs to start so the identified time period for transmitting the modified message can begin.

12. A method comprising:
    receiving, by a first device of a plurality of devices in a wireless network, a first message from a source device, the message including a retransmission value and a destination device identifier that identifies a destination device from among the plurality of devices;
    receiving a predefined timing signal from the source device, wherein the predefined timing signal is appended to the first message, the timing signal comprising a series of bits that change in value at a frequency similar to the frequency of a native clock in the receiving device;
    based upon a result of a comparison of the destination device identifier with a first device identifier, performing a sequence of actions selected from the group consisting of:
    (i) determining that the first device is not the sole destination device;
       decrementing the retransmission value; and
       transmitting, by the first device, a first modified message based upon the first message and the predefined timing signal, the first modified message comprising the decremented retransmission value; and
    (ii) determining that the first device is a destination device; and transmitting an acknowledgement signal indicating that the first message was received by the destination device, the acknowledgement signal being transmitted after a period of time corresponding to a remaining expected retransmissions.

13. The method of claim 12, further comprising:
comparing a first device identifier to the destination device identifier.

14. The method of claim 12, wherein the first modified message includes the first device identifier.

15. The method of claim 12, further comprising:
synchronizing a clock to the predefined timing signal.

16. The method of claim 12, further comprising:
receiving at a second device the first message and the predefined timing signal;
comparing the device identifier to a second device identifier of the second device;
in response to a determination that the second device is an intermediary device, decrementing the retransmission value in the first message; and
transmitting, by the second device, a second modified message based upon the first message and the predefined timing signal, the second modified message including the decremented retransmission value.

17. The method of claim 12, further comprising:
in response to a determination that the second device is a destination device, transmitting an acknowledgement signal indicating that the first message was received by the destination device, the acknowledgement signal being broadcast at a time selected without regard to the timing signal.

18. A method, comprising:
generating a data frame based on input signals received at a processor, wherein the data frame includes data identifying a destination device and a retransmission value;
appending a timing signal to the end of the data frame to form a message including the data frame and the timing signal, the timing signal comprising a series of bits that change in value at a frequency similar to the frequency of a native clock in the receiving device;
broadcasting the message to a plurality of devices;
receiving the message by a plurality of intermediary devices of the plurality of devices that are not the destination device;
processing the message at all of the intermediary devices that receive the message to determine if the message is to be retransmitted based on the retransmission value;
substantially synchronizing a native clock of all the intermediary devices that received the message to the timing signal appended to the message;
generating a modified message at the intermediary devices that received the message by changing the retransmission value in the message; and
transmitting the modified message substantially simultaneously by each of the respective intermediary devices that received the message according to the intermediary device's synchronized clock.

19. The method of claim 18, further comprising:
in response to a determination that the receiving device is a destination device, modifying the message to indicate the number of times the message was retransmitted.

20. The method claim 18, further comprising:
processing the message at all of the intermediary devices that receive the message to determine if the intermediary device is a destination device.

21. A method comprising:
receiving by a first device a first message from a source device, the message including data identifying a destination device from among a plurality of devices in a wireless network;
determining that the first device is an intermediary device;
determining a time at which a last data frame of the first message ends;
determining a time period for transmitting a modified message, the time period being equal to a predefined synchronization time period;
synchronizing a clock of the first device to a predefined timing signal included with the first message; and
transmitting, by the first device, a first modified message based upon the synchronized clock and the identified time period.

22. The method of claim 21, wherein the predefined timing signal is appended to the first message.

23. The method of claim 21, further comprising:
modifying the first message by changing a predetermined number of message retransmissions included in the first message.

24. The method of claim 23, wherein the changing comprises decrementing the number of message retransmissions.

25. The method of claim 21, further comprising:
receiving the first message by a second device simultaneously with the first device;
determining that the second device is an intermediary device;
identifying a time period for transmitting a modified message;
synchronizing a clock of the second device to a predefined timing signal included with the first message; and
transmitting, by the second device, a second device modified message based upon the synchronized clock and the identified time period.

26. The method of claim 25, wherein the second device modified message is transmitted simultaneously with the modified message sent by the first device.

27. The method of claim 26, further comprising:
synchronizing a clock in each respective device of the plurality of devices to the predefined timing signal in the message.

28. The method of claim 21, further comprising:
in response to a determination that the first device is an intended recipient of the first message, transmitting regardless of the timing signal by the first device an acknowledgement signal indicating that the signal was received by the first device.

29. The method of claim 21, further comprising:
in response to a determination that the message is to be retransmitted, transmitting the modified message based on the timing signal.

30. The method of claim 21, wherein the first modified message includes the data identifying the destination device as the intended recipient of the device.

31. The method of claim 21, wherein the message includes an indicator that signals a timer needs to start so the identified time period for transmitting the modified message can begin.

* * * * *